United States Patent [19]

Chawan et al.

[11] Patent Number: 4,990,349

[45] Date of Patent: Feb. 5, 1991

[54] MICROWAVABLE PASTA PRODUCT COMPRISING TRIETHYL CITRATE AND EGGS AND A PROCESS FOR PREPARING SAME

[75] Inventors: Dhyaneshwar B. Chawan, Liverpool; Carleton G. Merritt, Phoenix, both of N.Y.; Wiley W. Hargrove, Crystal Lake, Ill.

[73] Assignee: Borden, Inc., Columbus, Ohio

[21] Appl. No.: 451,735

[22] Filed: Dec. 15, 1989

Related U.S. Application Data

[63] Continuation-in-part of Ser. No. 404,828, Sep. 7, 1989, abandoned.

[51] Int. Cl.$^5$ ................................................ A23L 1/00
[52] U.S. Cl. ..................... 426/243; 426/107; 426/557
[58] Field of Search ................. 426/557, 243, 107, 451

[56] References Cited

U.S. PATENT DOCUMENTS

| | | | |
|---|---|---|---|
| 4,042,714 | 8/1977 | Torres | 426/557 |
| 4,394,397 | 7/1983 | Lometillo et al. | 426/557 |
| 4,803,088 | 2/1989 | Yamamoto et al. | 426/557 |
| 4,840,808 | 6/1989 | Lee et al. | 426/557 |

Primary Examiner—George Yeung
Attorney, Agent, or Firm—Dennis H. Rainear; Kenneth P. Van Wyck

[57] ABSTRACT

A process for preparing a microwave cooked pasta product is disclosed. The process comprises the steps of (a) combining flour, egg whites, water, and optionally whole eggs, and a dibasic or tribasic organic acid derivative such as a tricarboxylic acid ester derivative, to form a paste, (b) drying the paste to produce pasta at drying temperatures of 100° to 130° F., (c) optionally soaking the pasta in hot or cold temperature liquid for a period of time sufficient to at least partially hydrate the paste, (d) heating the pasta for a period of time sufficient to cook the pasta, e.g. about 1 to 2 minutes. A preferred acid derivative is triethyl citrate. The heating can be achieved by exposure to microwave radiation. The cooked pasta is characterized by a starch loss upon cooking of less than about 8% by weight, based on uncooked pasta weight, and by texture superior to that obtained without the dibasic or tribasic organic acid derivative. A shelf stable, microwave cookable, prepackaged pasta or noodle product is also disclosed.

46 Claims, No Drawings

MICROWAVABLE PASTA PRODUCT COMPRISING TRIETHYL CITRATE AND EGGS AND A PROCESS FOR PREPARING SAME

This application is a continuation-in-part of an earlier application with Ser. No. 07/404,828 filed Sept. 7, 1989, which is hereby abandoned.

This invention is directed to a process for preparing a pasta product with improved texture which is capable of microwave cooking in less than about two minutes. Specifically, this invention deals with a process for making microwavable pasta comprising an additive, such as triethyl citrate, and optionally eggs, whereby a drain step is not needed, cooking losses are reduced, and pasta texture is improved relative to pasta without the additive.

Pasta consumption is enjoying a rise in popularity for reasons of health, nutrition, convenience and economy. Home consumers and restauranteurs are therefore in need of a pasta product which is prepared in a very short amount of time without loss of palatability, texture or flavor.

It is highly desirable to have a pasta product which may be microwave cooked. It is known in the art to prepare microwave cooked pasta. For example, Golden Grain Macaroni Company markets a product which is cookable in warm water. The package directions require placing pasta in warm water; microwaving to boiling, continued boiling for three minutes to absorb water; and flavoring with a cheese sauce. However, the boiled pasta suffers great starch loss and is only palatable when sauce is added to the boiled product to mask its gumminess and starchiness.

The present invention is related to the inventions disclosed in the following copending applications which are assigned to the same assignee, said prior applications being incorporated herein by reference; USSN 325,211 filed July 28, 1988; USSN 231,663, filed Aug. 12, 1988 as a continuation-in-part of USSN 039,744, filed Apr. 20, 1987; USSN 140,208, filed Dec. 31, 1987; USSN 149,509, filed Jan. 28, 1988; USSN 07/225,211, filed July 28, 1988; USSN 07/099,923, filed Sept. 23, 1987; USSN 323,880 filed May 19, 1989; USSN 342,236, filed Apr. 24, 1989, and USSN 07/404,828, filed Sept. 7, 1989.

SUMMARY OF THE INVENTION

The present invention involves a process for preparing a microwave cookable pasta or noodle product. The pasta product is prepared in such a way as to (1) stabilize it against starch leaching in cold water, (2) reduce cooking losses, (3) eliminate the draining step, (4) facilitate low temperature drying of the pasta, and (5) improve texture and golden color retention. By "pasta" herein is meant the product of water and glutinous or farinaceous flour which has been dried. "Pasta" herein shall include noodle and egg noodle products.

The pasta of the present invention comprises glutinous or farinaceous flour such as, but not limited to, semolina, and an additive such as triethyl citrate. It has surprisingly been discovered that the addition to the pasta of small amounts of an edible dibasic or tribasic acid derivative, preferably a tricarboxylic acid derivative, such as triethyl citrate, significantly improves the texture of the pasta when cooked, facilitates low temperature drying of the pasta without cracking or other adverse effects on the quality thereof, and reduces the cooking losses to less than about 5.0 by weight. The pasta product is preferably cooked by microwave radiation, but conventional boiling is also a useful cooking method herein.

One process of this invention is performed by the steps of (a) preparing an alimentary paste or pasta dough comprising flour, a liquid, and triethyl citrate in egg whites; (b) exposing the pasta dough to an elevated temperature, preferably between about 100° F. (37.8° C.) and about 130° F. (54.4° C.) for a period of time sufficient to at least partially dry the pasta; and (c) cooking the pasta resulting from the preceding step for a period of time shorter than would be needed to cook pasta which did not contain triethyl citrate. Starch loss from the microwave cooking of the pasta is less than about 6.0% by weight of the uncooked pasta by the microwave cooking loss test described herein. Because of the presence in the pasta of the triethyl citrate, the texture of the cooked pasta is fuller, smoother and more resilient than pasta produced without the triethyl citrate. In addition, the pasta dough of the present invention can be dried at temperatures as low as 100° F. to 115° F. Furthermore, the pasta produced by the present method is not grainy, gummy, sticky or mushy Finally, the pasta product can be cooked without a draining step.

In another embodiment of the present invention, the drying of the alimentary paste or pasta dough is replaced by a heating step. The heating step, which may be the same as or in addition to the drying step, is useful for sterilization and/or pasteurization of the product. Thus a 10 to 30 minute heating step, preferably about 15 minutes, at, for example, 165° F. is preferred for sterilization of the product. The heating can be achieved by exposing the pasta dough or alimentary paste to microwave radiation, dielectric heating radiation, or other heat sources effective for sterilizing or pasteurizing the product.

In preferred embodiments, the heating for cooking the pasta step may be accomplished either by microwave heating, or by immersion in hot or boiling water.

In another embodiment, the invention relates to a shelf stable, microwave cookable, prepackaged pasta product containing uncooked pasta comprising triethyl citrate, preferably with egg whites, and optionally a sauce capable of preparation to a consumable, servable state by addition thereto of room temperature liquid, and cooking in a microwave oven.

One advantage resulting from the use of triethyl citrate, preferably with egg whites, in the present invention is that the resulting pasta can be dried, without adverse effects on the texture, at temperatures significantly lower than temperatures normally used to dry conventional pasta. Thus temperatures of, for example, 100° F. to 130° F. and more preferably from 105° F. to 110° F. can be used to dry pasta produced by the present invention.

Another advantage of the present invention is the superior texture of the cooked pasta relative to pasta prepared without an additive such as triethyl citrate. This is also operative in noodles or egg noodles wherein triethyl citrate is added to the dough along with whole eggs, or egg yolks. Thus noodle products are produced with improved texture and reduced cooking losses when triethyl citrate is added and egg is present in an amount exceeding 5.0% by weight and preferably exceeding 5.5% by weight.

Also by the present invention a no-drain, microwave cookable, pasta product, serviceable as, for example, a casserole dish, is provided. Since in a casserole-type dish there is no draining, all the starch, minerals, vitamins and desired golden color are retained in the product of the present invention. Draining constitutes an awkward, difficult and potentially dangerous step due to splashing of the boiling water.

DETAILED DESCRIPTION OF THE INVENTION

This invention pertains to a process for preparing a microwave cookable pasta product, including noodle or egg noodle product, and the product produced by said process. The process comprises the steps of adding triethyl citrate or other edible dibasic or tribasic organic acid derivative, such as a tricarboxylic acid derivative, optionally premixed in egg whites, to glutinous or farinaceous flour and water to produce an alimentary paste. The paste can be shaped and dried to produce a pasta, and microwave cooked in a period of only about 8 to about 10 minutes. The microwave cooking time can be further reduced down to 1 to 2 minutes if the pasta is held in liquid such as water prior to microwave cooking.

By "edible dibasic or tribasic acid or acid derivative" herein is meant any edible, or food grade or GRAS approved chemical, compound or material which is a difunctional or trifunctional organic acid derivative. Preferred materials include dicarboxylic acid derivatives, tricarboxylic acid derivatives, and lower-alkyl esters thereof. Thus triethyl citrate, which is the ethyl ester of citric acid, diethyl tartrate, diethyl maleate, and triacetin will also be operative in the present invention. Organic acids and their derivatives are preferred herein but edible inorganic difunctional and trifunctional acids are also expected to be operative in the present invention.

It is a surprising advantage of the present invention that it is possible to prepare dried, uncooked pasta or noodles from alimentary paste comprising glutinous or farinaceous flour, water, and triethyl citrate with or without egg whites, and subsequently cook the pasta in a liquid for a short period of time without appreciable loss of starch into the liquid and with retention of superior texture and a golden color.

Uncooked pasta may be prepared in the present invention from any formulation known in the art as long as a dibasic or tribasic organic acid, such as a tricarboxylic acid, derivative, such as triethyl citrate, is added as described herein. By "uncooked" is meant pasta wherein a major portion, i.e., greater than about 80% by weight of the total starch content, is ungelatinized. The term "cooking" as used herein refers to the process of gelatinizing the starch and heating the pasta.

Pasta is prepared from an "alimentary paste" or dough by which is meant a glutinous or farinaceous flour and water mixture. Alimentary pastes or doughs are generally made from coarse, hard flours obtained from hard wheat such as the middlings of durum wheat, often referred to as "semolina flour" or "semolina". Semolina comprises a major portion of the flour in alimentary pastes because it is highly glutinous, i.e. has a high content of the protein gluten which is capable of denaturing to provide a self-supporting pasta. "Pasta" herein can also include noodles and egg noodles. Noodles or egg noodles are pasta products further comprising eggs. By "noodle" or "pasta noodle" herein is meant food prepared by drying formed units of dough made from semolina, durum flour, farina flour, or any combination of two or more of these, with liquid eggs, frozen eggs, dried eggs, egg yolks, frozen yolks, dried yolks or any combination of two or more of these, with or without water. The total solids of the pasta noodles herein preferably contains not less than 5.5% by weight of the solids of egg or egg yolk. Lower levels of solids of egg or egg yolk such as 3-5% by weight are also operative herein, but would not be within the 21 CFR Section 139.150 definition of noodle products. A preferred level of egg for noodle products is 5.5% to 6.0% by weight, but the upper limit should not exceed 20% by weight.

A typical alimentary paste used to prepare pastas suitable for the present invention comprises between about 67.0% and about 80.0% by weight of wheat flour such as, but not limited to, semolina flour (having an inherent moisture content of between about 10% and about 15% and preferably between about 11% and about 14% by weight, and a gluten content of between about 11% and 14% by weight), triethyl citrate, egg whites, optional additives including whole eggs or egg yolks, and added water.

The triethyl citrate or other edible dibasic or tribasic acid ester derivative is preferably first mixed with egg whites at levels of, for example, 100 to 500 parts per million, which mixture is then added to the flour and water at a level of, for example, 2% by weight. These amounts are not limitations herein, and the parts per million of the edible acid derivative in the alimentary paste can vary from about 0.25 to about 50. In the case of noodles or egg noodles prepared from the pasta dough, the whole egg or egg yolk content of the pasta should be at least 5.0% by weight and preferably exceeding 5.5% by weight.

Several optional additives may be added to the flour/water alimentary pastes suitable for use in the present invention. Some suitable additives, discussed herein below, include glycerol monostearate (GMS), an added low temperature coagulatable protein material, and a sulfhydryl reducing agent.

The first optional additive is glycerol monostearate (GMS). When optionally used, GMS improves the texture by reducing stickiness of the resulting alimentary paste, and also reduces the pressure necessary to extrude the paste. When used, GMS comprises between about 0.5% and about 2.0% by weight of the alimentary paste, and preferably between about 1.0% and about 1.5% by weight of the paste.

The second optional additive is a low temperature coagulatable protein material, distinct from the gluten component inherent in the semolina. These protein materials are ones which coagulate (i.e., denature) at temperatures of about 160° F. (71.1° C.). The exact temperature at which the protein denatures is dependent on various factors including moisture content; higher moisture contents require lower temperatures to denature the protein material. The protein material may serve to enhance the denaturing effect of the present invention, rendering resultant pastas somewhat more resistant to starch leaching in cold milk or water. The proteins include, but are not limited to, albumin, whole egg, egg whites, egg yolk, soybean isolate, whey protein concentrate, and mixtures thereof. Preferred protein materials are whole egg, egg yolks and egg whites. When used, the protein component comprises up to 3.0% by weight of the total alimentary paste, preferably between about 0.5% and about 3.0% by weight based on the alimentary paste.

A third optional additive is one or more sulfhydryl reducing agents. The presence of the sulfhydryl reducing agent, in addition to permitting the formation of an extrudable dough with less added moisture, is believed to facilitate the irreversible denaturation of the gluten. Sulfhydryl reducing agents which have been found to be useful in the manufacture of pasta products include sodium metabisulfite ($Na_2S_2O_5$), cysteine, water-soluble cysteine salts such as l-cysteine hydrochloride, glutathione and other sulfite salts. Sulfhydryl reducing agents are compounds which are capable of initiating reductions which reduce —S—S— bonds in gluten to form —SH groups. The sulfhydryl reducing agents may be utilized either singularly or in combination. The percentage of the sulfhydryl reducing agent present in the pasta paste or dough before drying, when used, is between about 0.005% and about 0.2% by weight of the paste, and preferably between about 0.02% and about 0.04% by weight, based on paste weight before drying. The percentage range remains the same for a combination of sulfhydryl reducing agents.

Other optional ingredients include those typically added to enrich food products, e.g., B-vitamins, thiamine, riboflavin, niacin, niacinamide, vitamin D, calcium, iron and vegetable matter.

Additional additives can include lipid-base flavorants as taught and claimed in U.S. patent application Ser. No. 149,589, Gillmore et al., filed Jan. 28, 1988, assigned to the assignee of the present invention. That application is herein incorporated by reference.

The remainder of the paste comprises water. Water is preferably introduced in the form of ice during extrusion, to prevent swelling of the paste during extrusion. The preferred wheat flour inherently contains about 11% to 14% by weight moisture. The total water, or moisture, content of the paste of the present invention is preferably between about 17.0% and about 30.0% by weight of the paste. In this application, water or moisture content refers to total moisture content of the paste, i.e. the total of inherent moisture from the glutinous or farinaceous flour plus the added water. The term "water" as used herein includes water in all physical states, i.e. steam, ice or liquid, or mixtures thereof and flavored liquids such as soups, milk, broths, etc.

The flour, egg whites, egg yolks or whole eggs if desired and triethyl citrate, or other edible dibasic or tribasic ester acid derivative, water and any desired additives may be mixed in any way conventional in the art, such as by mixing in a vertical cutter mixer (e.g., a Hobart Cutter/Planetary Mixer) for an appropriate time, such as approximately one minute, or until the pasta paste or dough is ready for extrusion or sheeting into any pasta shape. Alternatively, the components of the paste may be separately introduced into an extruder without prior mixing. These extruded or sheeted pasta shapes are then preferably subjected to a drying step, discussed below.

Shaped pasta or noodle products may be prepared from the paste either by extrusion, sheeting or by rolling. All conventional pasta shapes are suitable for use in this invention.

The extruded pasta product may be in any of the conventional pasta shapes, such as spaghetti, linguini, rotini, elbows, spirals, shells, conchiglioni, ziti, vermicelli, fusilli, fettucine, tortellini, ravioli, manicotti, lasagna, rote or tortiglioni.

Alternatively, a non-extruded pasta product, such as fettucine which is prepared from rolled sheets of alimentary paste, may be utilized in the present process.

A suitable extrusion process is a so-called low moisture process, i.e. one where the final moisture content of the resulting paste is between about 20% and about 28% by weight, based on total moisture in the pasta. Such a process is disclosed in U.S. Ser. No. 39,744, to Ventres, et al., filed Apr. 20, 1987, assigned to the assignee of the present invention. That application is herein incorporated by reference.

While particularly close control of the moisture content is not essential, it is desirable to keep the moisture content within a range of between about 16% and about 28% by weight. A particularly preferred moisture content is less than or equal to about 26% by weight. A moisture content above about 16% is desirable because protein denaturation is facilitated at such levels, and because the temperature necessary to denature the gluten is higher with lower moisture contents. However, If the moisture content is above about 30%, starch gelatinization begins to occur.

Following shaping, conventional pasta is generally subjected to a drying step to lower its initial moisture content from between about 17% and about 30% by weight down to between about 10% and about 15% and preferably between about 11% and about 14%, based on the weight of the dried pasta. A suitable dryer for use in the present invention is disclosed in U.S. Pat. No. 4,699,048 to Pavan, herein incorporated by reference. Other suitable dryers include Standard Industries' batch dryer and Stein's continuous dryer. Due to the presence of the dibasic or tribasic acid derivative such as triethyl citrate, the pasta of the present invention can be dried at temperatures as low as 100° F. to 115° F. without adversely affecting the texture obtained after subsequent microwave cooking.

The pasta of the present invention can be, but need not be, exposed to initial temperatures from about 160° F. (71.1° C.) to about 220° F. (104.4° C.) (preferably 165° F., or 73.9° C. to 180° F., or 82.2° C.) for a period of at least 15 minutes, and then finishing the drying at a temperature of from approximately 90° F. (32.2° C.) to about 160° F. (71.1° C.) (preferably about 110° F., or 43.3° C.) for an additional 30 minutes to two hours. If the initial heat treatment does not involve an exposure to at least 160° F. (71.1° C.), protein denaturation will not occur; if the temperature goes significantly above 220° F. (104.4° C.), vitamins and the essential amino acid lysine present in the pasta may be destroyed, and a brown coloration may result. Additionally, at temperatures above 212° F. (100° C.) water will boil out of the pasta, which may result in cracking and a resultant weakened structure.

If the drying temperature is in excess of about 110° F. (43.3° C.) and below about 160° F. (71.1° C.), protein denaturation is facilitated by the addition of the low temperature coagulatable protein such as whole egg, egg yolk, soybean isolate, whey, animal blood plasma, and albumin.

Another preferred means of drying the paste into pasta is via microwave heating. This mode of drying is advantageous inasmuch as it is very fast and efficient, and reduces the problem of cracking.

However, any of the heat means discussed above, so long as it results in a temperature in the required range, may be successfully employed.

Alternatively, though less preferably, an uncooked pasta comprising the dibasic or tribasic organic acid ester derivative in egg whites may be prepared in the absence of a heating step exceeding 110° F. (43.3° C.). In this alternative embodiment, a sulfhydryl reducing agent, (e.g. cysteine), in addition to a low temperature coagulatable protein, may be added to the alimentary paste from which the pasta is made. While not desiring to be bound to any particular theory, it is believed that the reducing agent sets the denatured protein in a stable configuration capable of binding starch granules.

The pasta produced by any of the above methods may be packaged by any means known in the art. A preferred mode of packaging is to package the uncooked pasta into individual or family size portion containers or microwavable trays.

In a more preferred embodiment discussed hereinbelow, the pasta may be packaged in a microwave-safe, e.g. plastic or cardboard, container in combination with a dehydrated sauce.

In another embodiment of the present invention, the packaged pasta product produced by the methods described herein is subjected to a temperature sufficient to sterilize or pasteurize the contents of the package. In this manner a pasteurized pasta product within a boil-proof or microwavable container is provided which will exhibit shelf stability in excess of three months.

The pasta products prepared in accordance with the above processes may now be subjected to the cooking process of the present invention. In one embodiment, this process involves adding the pasta to cold or warm water and a brief cooking step. The pasta containing, for example, triethyl citrate which results is characterized by a cooking loss (by the microwave cooking test method described below) after the microwave cooking step of less than about 6.0% by weight, based on the weight of the uncooked pasta, and also displays excellent texture, essentially free of graininess, gumminess, mushiness, and stickiness.

The first step of the cooking process can optionally include soaking the uncooked pasta, comprising an edible dibasic or tribasic acid derivative such as triethyl citrate, and egg whites, in ambient temperature liquid, i.e. liquid at a temperature between about 40° F. (4.4° C.) and about 75° F. (23.9° C.) for a period of time sufficient to at least partially hydrate the pasta. By "hydrated" is meant that the pasta has absorbed liquid to the point that no hard centers remain in the pasta. Water-based cooking fluids such as milk or broth may be employed in lieu of, or in combination with, water. If desired, the soaking step can be performed under refrigeration conditions to retard or prevent microbial growth.

With or without presoaking, the pasta is subjected to heat sufficient to cook it. Cooking may be accomplished in a number of ways, via exposure to a heat source selected from boiling water, steam, superheated steam, hot air, dielectric heat, microwave radiation, ultrasonic radiation and radiant heat. Following cooking, the pasta of the present invention experiences a starch loss of less than about 6.0% by weight based on uncooked pasta weight measured by the microwave cooking loss test described herein.

Preferred methods of heating to cook include immersion in boiling water and microwave heating. Heating by microwave irradiation has the advantage of eliminating the need for draining the pasta after cooking, which not only offers convenience and improved safety but also reduces the loss of water-soluble vitamins, color, minerals and other nutrients. By judicious choice of the volume of liquid added, no draining is required after cooking.

Generally, the microwave cooking time in the present invention is in the range of about 1 to 5 minutes, and more preferably 1 to 2 minutes. According to the present invention, longer shapes of pasta (such as spaghetti) require up to about 8 minutes cooking time, whereas shorter varieties (such as elbow macaroni) require only about 1 to 4 minutes to microwave cook. In contrast, conventionally prepared pasta which does not contain triethyl citrate cannot be low temperature dried, must be drained, requires at least 7 minutes cooking time in boiling water, and exhibits a texture significantly inferior to the texture of pasta of the present invention.

In another embodiment, the invention pertains to a shelf stable, microwave cookable prepackaged pasta product. By "shelf stable" is meant that the packaging protects its contents from degradation under non-refrigerated conditions (i.e., above 40° F. (4.4° C.) for a time period of up to about 36 months time. The package contains uncooked pasta and optionally a sauce. The pasta may be packaged dry in a conventional container, microwavable carton or tray, or sealed in vapor barrier plastic pouches, which packages are disclosed in application U.S. Ser. No. 195,803, filed May 19, 1988, herein incorporated by reference.

The sauce may be a dehydrated one which contains either a natural or artificial flavoring and which may contain the flavor of cheese, cream, butter, tomato sauce, or any other desired flavoring, and which is hydratable by addition of small amounts of warm or cold (i.e., less than 70° F. or 21.2° C.) liquid. The cheese of the sauce can be prepared by the methods disclosed in copending application U.S. Ser. No. 336,502 titled "A Process For The Preparation Of Improved Non-Bitter Enzyme Modified Cheese Flavoring Material and Spray Dried Product", filed Apr. 11, 1989, or U.S. Pat. No. 4,853,232, issued Aug. 1, 1989 to Subramaniam, et al., which are incorporated by reference herein. Alternatively, a water-based liquid such as milk or broth may be used to hydrate the sauce. The sauce may be packaged separately from the pasta for separate cooking or may be premixed with the pasta.

The pasta product is packaged in any packaging in which the product is shelf stable and which is microwave safe and penetrable. Such packaging includes cardboard or plastic. The packaging may comprise individual portions (e.g., of 3 to 4 ounces each), family-size portions or bulk portions (e.g., of 5 to 10 pounds) for institutional use.

The microwave cookable prepackaged product may be prepared by adding non-boiling water or other liquid, e.g. tap water, soup, broth, milk, etc., to either each of the separate packages for the sauce and pasta or, preferably, directly to the package itself containing a mixture of the two. The amount of added liquid should be sufficient to hydrate the pasta and dry sauce mix but preferably small enough that, after cooking, essentially all of the liquid is absorbed into the product so that draining of excess liquid is not necessary.

According to this embodiment, the liquid should be added to the pasta and/or source, if any, and then the mixture subjected to microwave heating for a period of time sufficient to completely cook the product (e.g. up to about 10 minutes). The resulting pasta exhibits a starch loss of less than about 6.0% by weight based on the uncooked pasta as measured by the microwave cooking loss test described herein. If the pasta remains in contact with the liquid for a longer period of time, i.e. sufficient to more fully hydrate it, microwave cooking may be accomplished in one to two minutes. After cooking in a microwave oven, the pasta product is in a consumable, servable stage.

In the embodiment where the sauce and pasta are packaged separately, the contents of the package are mixed after the pasta is cooked, and the product is servable and consumable without additional preparation such as draining. In this manner, a no-drain casserole such as macaroni and cheese is easily prepared by adding water or a water-containing liquid to the microwavable pasta along with optional flavorants such as butter, cheese sauce, etc. The mixture is exposed to heating via microwave radiation with occasional stirring, if desired, until cooked.

A further embodiment of this invention is a one-step, no drain cooking process whereby the pasta is placed in the minimal amount of water needed to hydrate it during or before exposure to heat sufficient to cook the pasta, without excess water remaining after cooking.

The following Examples are provided to further illustrate the invention. In these Examples and throughout the specification, all temperatures are expressed in degrees Fahrenheit and each value is accompanied by an approximation of such value in degrees Celsius. In addition, all percentages are by weight, unless expressly indicated to be

EXAMPLES

EXAMPLE 1

For the following tables, samples of alimentary pastes were made by mixing the following ingredients:

| Sample No. | |
|---|---|
| I. Control | |
| Semolina (13.2% H$_2$O) | 6000 gm |
| Water | 1440 gm |
| II. Triethyl Citrate and Fresh Frozen Egg Whites | |
| Semolina (13.4% H$_2$O) | 4000 gm |
| Fresh Frozen Egg Whites (88.5% H$_2$O) | 174 gm |
| Water | 725 gm |
| Triethyl Citrate | 0.069 gm |
| III. Fresh Frozen Egg Whites | |
| Semolina (13.4% H$_2$O) | 4000 gm |
| Fresh Frozen Egg Whites (88.5% H$_2$O) | 174 gm |
| Water | 725 gm |
| IV. Dried Egg Whites and Triethyl Citrate | |
| Semolina (13.2% H$_2$O) | 6000 gm |
| Dried Egg Whites 0.5% Solids | 30 gm |
| Water | 1440 gm |
| Triethyl Citrate | 0.069 gm |
| V. Dried Egg Whites and Triethyl Citrate | |
| Semolina (13.2% H$_2$O) | 6000 gm |
| Dried Egg Whites 0.85% Solids | 51 gm |
| Water | 1440 gm |
| Triethyl Citrate | 0.115 gm |
| VI. Triethyl Citrate | |
| Semolina | 6000 gm |
| Water | 1440 gm |
| Triethyl Citrate | 0.115 gm |

The alimentary paste feedstocks used in the Tables comprised semolina flour having about a 13.2% moisture content. The quantity of added water was often varied with each Example and this quantity is specified within each Example. Water was added slowly to the Hobart mixer over a period of 2-4 minutes while the mixer was in operation Following the addition of water, the feedstock mixture was allowed to mix for about 6 minutes. The premixed feedstock was then placed in the "former vessel" of a Mapimpianti GF 20 extruder (available from Mapimpianti, Padova, Italy). Only the F-20 section of the Mapimpianti extruder was used. The screw used was about 20.5 inches (about 520 mm) long with an 80 mm diameter for about the first 4 inches (100 mm) and a 56 mm diameter for the remaining 16.5 inches (about 420 mm). The extruder held about 800 grams of paste. The dwell time in the extruder ranged from 40 to 100 seconds. A Mapimpianti #1011 elbow die was used having 18 openings of about an 8 mm diameter and a wall thickness of about 0.7 mm. The Mapimpianti #1011 die has total openings of about 289 mm$^2$.

The F-20 section of the GF 20 extruder was modified to accomodate the prefixed feedstock by removal of the feed mechanisms for the separate addition of water and semolina and by covering each opening in the barrel for the separate feeds with a 6×4 inch plate. The extruder water jacket, which surrounds about ⅔ of the final portion of the extruder, was split into two sections and equipped with independent control systems. Water having a temperature about equal to the desired barrel temperature was circulated through the extruder water jackets from a ten gallon (about 38 liters) reservoir. The water heated the extruder prior to start up and maintained a substantially constant temperature during operation. The opening to the former vessel was reduced from 3 inches to 1 inch by welding a stainless steel plate thereto to prevent backfeeding of the premixed feedstock. The blades of the former vessel operated at about 10 to 160 r.p.m.

The alimentary pastes produced were then fed into the screw of the pasta extruder and forced through an elbow macaroni die. The extruder was operated at a screw speed of 20 rpm; screw temperature of 100° F. (37.8° C.); barrel temperature of 100° F. (37.8° C.); head temperature of 120° F. (48.9° C.); and die pressure of 1500 psig. Desired lengths were cut with a cutoff knife. Cut pieces of about 1 inch length of macaroni were placed on a drying tray.

Pasta herein can also be sheeted, or rolled or otherwise shaped.

The pasta was dried using a Standard Industries' 50-pound batch dryer at 110° F. (43.3° C.) at 80% relative humidity for 16 hours, or 8 hours at 135° F. (57° C.), or 3 hours at 185° F. (85° C.).

The microwave cooking losses and texture evaluations are shown in Table I. Microwave cooking losses were measured according to the following method.

100 grams of pasta (small elbows) were weighed into a 2.5 liter saucepan. 350 grams of distilled water at room temperature (70° F.) were added and the mixture was stirred well (5 seconds). The mixture was then cooked in a 650 watt microwave oven [NOTE: rate of microwave heating = 1.44 watts/minute (1.4 to 1.5 acceptable range)] on HIGH setting for 5 minutes. The mixture was stirred well (5 seconds) with a spoon or fork, then microwave cooked again for 5 minutes at the same setting. The mixture was again stirred well (5 seconds) with a spoon or fork, then approximately 500 grams distilled water at 140° F.±10° F. were added. The mixture was again stirred well (10 seconds) and drained through a tared colander, collecting the drain water. The pasta in the colander was then mixed or stirred (10 seconds) so that any water trapped in cooked pasta such as elbows was released. The pasta was then allowed to drain for 1 minute The drain water was weighed and the percent solids determined. The pasta in the colander was then weighed.

Calculations:

$$\% \text{ Cooking Losses} = \frac{\% \text{ Solids in Drain Water} \times \text{Weight of Drained Water (gm)}}{100 \text{ gms (Weight of Uncooked Pasta)}}$$

$$\% \text{ Weight Gain} = \frac{\text{(Weight of Cooked Pasta (gms)} - 100 \text{ gms)}}{100 \text{ gms (Weight of Uncooked Pasta)}} \times 100$$

Conventional cooking losses were measured according to the following method.

1500 grams of tap water were weighed into a 4 quart sauce pan. The water was heated to boil, held 15 seconds and then 50 grams of pasta added as quickly as possible. The mixture was stirred and the boiling was continued for 12 minutes, after which time the mixture was strained through a tared colander and held therein for 1 minute. The colander and pasta were weighed and the drain water collected and weighed for determination of total solids level.

$$\% \text{ cooking loss} = \frac{\% \text{ total solids in drain water} \times \text{ weight of drain water}}{50}$$

The resulting solids (starch) loss, also called % cooking loss, into the drain water and the subjective texture evaluations are given in Tables I and II for various samples subjected to microwave cooking Tables III and IV show the cooking losses by conventional stove top cooking in boiling water and texture evaluation of the product produced by the method of Example 1. The percentages shown in the following Tables are weight percents.

Evaluations of the pasta textures were performed by trained test panelists. The results represent the subjective independent analyses of five (5) panelists evaluating the texture of the cooked product on a scale of 1 (poor) to 5 (excellent). On this scale, it has previously been determined that a pasta product must have a score of at least 3.0 to be acceptable to consumers and thus commercially viable. The results of the panelists' evaluations of the pasta of the present invention show a significant improvement in perceived texture relative to conventionally prepared control samples.

TABLE I

SMALL ELBOWS - EFFECT OF TRIETHYL CITRATE AND/OR FRESH FROZEN OR DRIED EGG WHITES ON MICROWAVE COOKING LOSSES AND TEXTURE AT LOW TEMPERATURE DRYING (100° TO 130° F.).

| Sample No. | % Cooking Loss | Texture* |
|---|---|---|
| I | 6.95 | 2.5 |
| II | 6.45 | 3.0 |
| III | 6.90 | 2.5 |
| IV | 5.95 | 3.5 |
| V | 5.45 | 4.0 |
| VI | 5.90 | 3.5 |

*1 = Poor (Mushy, Pasty, Sticky, etc.)
5 = Excellent (Springy, Not Pasty, etc.)

TABLE II

SMALL ELBOWS - EFFECT OF TRIETHYL CITRATE AND/OR FRESH FROZEN EGG WHITES ON MICROWAVE COOKING LOSSES AND TEXTURE AT MEDIUM (130°-160° F.) AND HIGH (160°-190° F.) DRYING.

| | Drying Temperatures | | | |
|---|---|---|---|---|
| | Medium | | High | |
| Sample No. | % Cooking Loss | Texture* | % Cooking Loss | Texture* |
| I | 6.45 | 3.0 | 5.45 | 4.0 |
| II | 5.45 | 4.0 | 5.90 | 3.5 |
| III | 6.40 | 3.0 | 5.95 | 3.5 |

*1 = Poor
5 = Excellent

TABLE III

SMALL ELBOWS - EFFECT OF TRIETHYL CITRATE AND/OR FRESH FROZEN OR DRIED EGG WHITES ON CONVENTIONAL COOKING LOSSES AT LOW TEMPERATURE DRYING (100° TO 130° F.).

| Sample No. | % Cooking Loss | Texture* |
|---|---|---|
| I | 6.80 | 3.0 |
| II | 7.60 | 3.5 |
| III | 8.11 | 3.0 |
| IV | 7.06 | 4.0 |
| V | 6.90 | 4.0 |
| VI | 6.98 | 3.5 |

*1 = Poor
5 = Excellent

TABLE IV

SMALL ELBOWS - EFFECT OF TRIETHYL CITRATE AND/OR FRESH FROZEN EGG WHITES ON CONVENTIONAL COOKING LOSSES AND TEXTURE AT MEDIUM (130°-160° F.) AND HIGH (160°-190° F.) TEMPERATURE DRYING.

| | Drying Temperatures | | | |
|---|---|---|---|---|
| | Medium | | High | |
| Sample No. | % Cooking Loss | Texture* | % Cooking Loss | Texture* |
| II | 7.80 | 3.0 | 8.03 | 3.5 |
| III | 7.86 | 3.0 | 8.45 | 3.0 |

*1 = Poor
5 = Excellent

TABLE V

EGG NOODLES - EFFECT OF TRIETHYL CITRATE ON TEXTURE AND COOKING LOSS.

| Sample | % Dry Basis | Texture* | Microwave Cooking Loss, % | Stovetop Cooking Loss, % |
|---|---|---|---|---|
| 1. Durum Flour | 94.3 | | | |
| Frozen Whole Eggs | 5.7 | | | |
| | 100.0 | 3.0 | 7.46 | 9.44 |
| 2. Durum Flour | 94.3 | | | |
| Frozen Egg White With 200 ppm Triethyl Citrate | 1.5 | | | |
| Frozen Egg Yolks | 4.2 | | | |
| | 100.0 | 4.0 | 6.62 | 8.81 |

*1 = Poor
5 = Excellent

TABLE VI

COOKING LOSSES AND TEXTURE OF SMALL ELBOWS HIGH EXTRACTION FLOUR, 29% DOUGH MOISTURE (110° F./16 HOURS DRYING)

| Product Composition | Triethyl Citrate ppm | Cooking Loss % Microwave | Cooking Loss % Stovetop | *Texture Microwave | *Texture Stovetop |
|---|---|---|---|---|---|
| Control | 0 | 6.36 | 7.78 | 2.5 | 3.5 |
| 0.5% Solids From Fresh Frozen Egg Whites | 11 | 6.13 | 7.78 | 3.5 | 3.5 |
| 1.0% Solids From Fresh Frozen Whole Eggs | 11 | 6.53 | 8.04 | 3.0 | 3.0 |

*1 = Poor
5 = Excellent

TABLE VII

COOKING LOSSES AND TEXTURE OF SMALL ELBOWS HIGH EXTRACTION FLOUR, 29% DOUGH MOISTURE (135° F./16 HOURS DRYING)

| Product Composition | Triethyl Citrate ppm | Cooking Loss % Microwave | Cooking Loss % Stovetop | *Texture Microwave | *Texture Stovetop |
|---|---|---|---|---|---|
| Control | 0 | 6.06 | 7.60 | 3.0 | 3.5 |
| 0.5% Solids From Fresh Frozen Egg Whites | 11 | 5.87 | 7.84 | 3.5 | 3.5 |
| 1.0% Solids From Fresh Frozen Whole Eggs | 11 | 6.20 | 7.97 | 3.5 | 3.5 |

*1 = Poor
5 = Excellent

TABLE VIII

COOKING LOSSES AND TEXTURE OF SMALL ELBOWS HIGH EXTRACTION FLOUR, 29% DOUGH MOISTURE (158° F./16 HOURS DRYING)

| Product Composition | Triethyl Citrate ppm | Cooking Loss % Microwave | Cooking Loss % Stovetop | *Texture Microwave | *Texture Stovetop |
|---|---|---|---|---|---|
| Control | 0 | 6.10 | 8.43 | 3.5 | 3.5 |
| 0.5% Solids From Fresh Frozen Egg Whites | 11 | 5.54 | 8.08 | 4.0 | 3.5 |
| 1.0% Solids From Fresh Frozen Whole Eggs | 11 | 5.69 | 7.98 | 3.5 | 3.5 |

*1 = Poor
5 = Excellent

TABLE IX

COOKING LOSSES AND TEXTURE OF SMALL ELBOWS HIGH EXTRACTION FLOUR, 29% DOUGH MOISTURE (180° F16 HOURS DRYING)

| Product Composition | Triethyl Citrate ppm | Cooking Loss % Microwave | Cooking Loss % Stovetop | *Texture Microwave | *Texture Stovetop |
|---|---|---|---|---|---|
| Control | 0 | 6.56 | 8.15 | 3.0 | 3.0 |
| 0.5% Solids From Fresh Frozen Egg Whites | 11 | 5.90 | 8.11 | 3.5 | 3.0 |
| 1.0% Solids From Fresh Frozen Whole Eggs | 11 | 5.69 | 8.04 | 3.5 | 3.0 |

*1 = Poor
5 = Excellent

Tables V-IX demonstrate a significant improvement in texture resulting from the addition of triethyl citrate to the egg noodle dough. The Tables also illustrate a significant improvement in reducing the cooking losses in both microwave cooking and stovetop cooking.

CONCLUSION

There has thus been discovered a novel pasta composition and a novel method for preparing a microwave cooked pasta product.

The key to the invention is the addition of triethyl citrate or other edible dibasic or tribasic acid derivative, preferably in egg whites, to the uncooked alimentary paste. In this manner, improved pasta and noodle products are produced. The effect is a greatly enhanced structural integrity of the resulting pasta and noodles which may be dried at temperatures lower than pasta is conventionally dried and cooked in a greatly reduced time period, i.e., about 1 to 2 minutes, and which has surprisingly improved texture and reduced cooking loss.

While the invention has been disclosed by reference to the details of preferred embodiments, the disclosure is intended in an illustrative rather than a limiting sense, as it is contemplated that modifications will readily occur to those skilled in the art, within the spirit of the invention and the scope of the appended claims.

What is claimed is:

1. A process for preparing a pasta product with improved texture and which can be rapidly cooked, said process comprising the steps of:
    (a) preparing uncooked pasta dough wherein the pasta dough comprises glutinous or farinaceous flour, liquid, and an edible acid derivative selected from ester derivatives of dibasic and tribasic organic acids; and
    (b) drying the pasta dough of step (a) to produce a dried pasta product.

2. The process as claimed in claim 1 wherein the organic acid derivative in step (a) is triethyl citrate.

3. The process of claim 1 wherein the pasta dough further comprises egg whites.

4. The process of claim 1 wherein the pasta dough further comprises eggs at a level exceeding 3.0% by weight.

5. The process of claim 1 wherein the pasta dough further comprises egg yolk at a level exceeding 3.0% by weight.

6. The process of claim 4 wherein the eggs are whole eggs.

7. The process of claim 4 wherein the eggs are selected from the group consisting of frozen eggs, liquid eggs, liquid eggs, dried eggs, egg yolks, frozen yolks, dried yolks, and combinations thereof.

8. The process of claim 4 wherein the eggs are whole eggs present at a level of 5.5% to 6.0% by weight.

9. The process according to claim 2 further comprising (c) heating pasta resulting from step (b) for a period of time sufficient to cook said pasta, wherein starch loss from said cooked pasta is less than about 6.0% by weight based on uncooked pasta weight, and wherein said cook time is less than would be needed to cook the pasta in the absence of triethyl citrate.

10. The process according to claim 9 wherein said heating step (c) is accomplished by microwave heating.

11. The process according to claim 9 wherein said heating step (c) is accomplished by immersion in boiling water.

12. The process according to claim 2 wherein the drying step of (b) is at a temperature and for a duration sufficient to pasteurize the pasta product.

13. The process according to claim 1 wherein the liquid of step (a) is selected from the group consisting of water, milk, broth and soup.

14. The process according to claim 1 wherein the flour is semolina produced from durum wheat.

15. The process according to claim 1 wherein the flour is farina flour.

16. The process according to claim 3 wherein the egg whites and the edible acid derivative are premixed before addition to the flour and liquid.

17. The process according to claim 16 wherein the acid derivative is triethyl citrate present in the egg white at a level ranging from about 100 to about 500 parts per million, and wherein the egg white/triethyl citrate mixture is added to the flour and liquid in an amount of from about 0.5% to about 5% by weight.

18. The process according to claim 1 wherein the pasta of step (b) is selected from the group consisting of spaghetti, linguini, rotini, elbows, spirals, shells, conchiglioni, ziti, vermicelli, fusilli, fettucine, tortellini, ravioli, manicotti, lasagna, rote, egg noodles, tortiglioni and mixtures thereof.

19. The process according to claim 2 wherein said uncooked pasta dough of step (a) comprises:
  (i) between about 67.0% and about 80.0% by weight of durum wheat flour having a moisture content in the range of between about 11% and about 14% by weight,
  (ii) between about 0% and about 2% by weight of glycerol monostearate,
  (iii) between about 0.5% and about 5.0% by weight of a mixture of egg whites and triethyl citrate wherein the triethyl citrate is present in the mixture in an amount ranging from about 100 to about 500 parts per million,
  (iv) between about 0% and about 0.2% by weight of a sulfhydryl reducing agent, and
  (v) the remainder water.

20. The process according to claim 19 further comprising a low temperature coagulatable protein material selected from the group consisting of albumin, whole egg, egg yolk, egg whites, animal blood plasma, soybean isolate, whey protein concentrate and mixtures thereof, wherein said low temperature coagulatable protein material is present in the pasta dough at less than 3.0% by weight.

21. The process according to claim 19 wherein said sulfhydryl reducing agent (iv) is selected from the group consisting of sodium metabisulfite, cysteine, water soluble cysteine salts, glutathione, and mixtures thereof.

22. A microwave cookable, uncooked pasta product prepared from an alimentary paste comprising glutinous or farinaceous flour, egg whites, water, and an edible acid derivative selected from derivatives of dibasic and tribasic organic acids wherein said pasta product is capable of preparation to a consumable, servable stage by addition thereto of liquid and exposing the pasta product and liquid to microwave radiation wherein said pasta is cooked, and wherein said pasta, after cooking, experiences a starch loss of less than about 7.0% by weight based on uncooked pasta weight, wherein the cooked pasta has improved texture relative to pasta prepared without a dibasic or tribasic organic acid derivative.

23. The pasta of claim 22 wherein the starch loss is less than 6.0% by weight.

24. The pasta of claim 22 wherein the edible acid derivative is triethyl citrate.

25. The microwave cookable, pasta product of claim 22 wherein the uncooked pasta is prepared from an alimentary paste which comprises:
  (i) between about 67.0% and about 80.0% by weight of wheat flour having a moisture content in the range of between about 11% and 14% by weight;
  (ii) between about 0% and 0.2% by weight of glycerol monostearate,
  (iii) between about 0.25 and about 50 parts per million of triethyl citrate,
  (iv) between about 0% and 0.2% by weight of a sulfhydryl reducing agent,
  (v) between 0% and about 5% by weight egg whites, and
  (vi) the remainder water.

26. The pasta product of claim 22 wherein said pasta is prepared by:
  (a) combining the wheat flour, glycerol monostearate, egg whites, triethyl citrate, sulfhydryl reducing agent, and water to form an alimentary paste,
  (b) extruding, sheeting or shaping said alimentary paste; and
  (c) drying said extruded, sheeted or shaped alimentary paste to form said pasta product.

27. A pasta product produced by the process of claim 1.

28. A pasta product produced by the process of claim 4 wherein the pasta product is an egg noodle.

29. A pasta product produced by the process of claim 14.

30. A pasta product produced by the process of claim 17.

31. A pasta product produced by the process of claim 19.

32. A process for microwave cooking pasta comprising the steps of:
  (a) adding a liquid with a temperature between about 33° and 140° F. (0.6 and 60° C.) to uncooked pasta, wherein the amount of liquid added is the minimal amount needed to hydrate the pasta, and wherein the pasta does not become gummy or mushy, and
  (b) exposing the liquid and uncooked pasta to microwave radiation of sufficient power and for sufficient duration to cook the pasta,
said uncooked pasta comprising glutinous or farinaceous flour, egg whites, water, and triethyl citrate.

33. The process of claim 32 wherein the liquid is not drained from the pasta, whereby a microwave cookable no-drain pasta casserole food product is prepared.

34. The process of claim 32 wherein the uncooked pasta in step (a) is allowed to soak in the liquid for up to about 10 hours before the cooking of step (b).

35. A shelf stable packaged microwavable pasta product comprising:
(a) a liquid-impervious package suitable for insertion in a microwave oven, able to tolerate the temperatures reached in the microwave cooking of pasta and bearing indications that its contents may be cooked in a microwave oven, and
(b) an uncooked pasta comprising glutinous or farinaceous flour, water, egg whites, and triethyl citrate.

36. The shelf stable pasta product of claim 35 wherein the cooked pasta further comprises whole eggs or egg yolks in an amount exceeding 5.5% by weight.

37. A shelf stable packaged pasta food product cookable in a microwave oven in its package comprising:
(a) a package of a size and construction suitable for cooking in a microwave oven, said package being liquid impervious and resistant to the temperatures encountered in the microwave cooking of pasta,
(b) an uncooked pasta comprising glutinous or farinaceous flour, water, egg whites, and triethyl citrate, and
(c) a dehydrated sauce containing a natural or artificial flavorant.

38. The shelf stable packaged pasta food product of claim 37 wherein the dehydrated sauce is intimately mixed with the uncooked pasta.

39. The shelf stable packaged pasta food product of claim 38 wherein the dehydrated sauce includes the flavor of cheese, cream, butter or tomato.

40. The shelf stable packaged pasta food product of claim 37 wherein the package bears indicia communicating that its contents cookable in a microwave oven.

41. The process of claim 19 wherein the pasta dough further comprises whole eggs or egg yolks in an amount exceeding 5.0% by weight.

42. The pasta product of claim 41 wherein the pasta product is an egg noodle.

43. The process of claim 32 wherein the uncooked pasta further comprises whole eggs or egg yolks at a level exceeding 5.0% by weight.

44. The process of claim 43 wherein the pasta product is an egg noodle.

45. The shelf stable packaged microwavable pasta product of claim 35 wherein the uncooked pasta further comprises whole eggs present at a level exceeding 5.0% by weight.

46. The process of claim 1 further comprising the steps of packaging the dried pasta product in a microwavable container and subjecting the packaged pasta product to a temperature sufficient to pasteurize the product.

* * * * *